US011466347B2

(12) United States Patent
Noujima

(10) Patent No.: US 11,466,347 B2
(45) Date of Patent: Oct. 11, 2022

(54) CR—FE—NI-BASED ALLOY PRODUCT

(71) Applicant: HITACHI, LTD., Tokyo (JP)

(72) Inventor: Masafumi Noujima, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 16/970,211

(22) PCT Filed: Nov. 9, 2018

(86) PCT No.: PCT/JP2018/041711
§ 371 (c)(1),
(2) Date: Aug. 14, 2020

(87) PCT Pub. No.: WO2019/163217
PCT Pub. Date: Aug. 29, 2019

(65) Prior Publication Data
US 2021/0130935 A1 May 6, 2021

(30) Foreign Application Priority Data

Feb. 20, 2018 (JP) .............................. JP2018-027781

(51) Int. Cl.
*C22C 27/06* (2006.01)
(52) U.S. Cl.
CPC .................................. *C22C 27/06* (2013.01)
(58) Field of Classification Search
None
See application file for complete search history.

(56) References Cited

U.S. PATENT DOCUMENTS 3,519,419 A 7/1970 Gibson et al.
2017/0292175 A1 10/2017 Noujima et al.

FOREIGN PATENT DOCUMENTS

| EP | 3202934 A1 | 8/2017 |
| JP | S46-027125 B1 | 8/1971 |
| JP | S53-108821 A | 9/1978 |
| JP | S61-124546 A | 6/1986 |
| JP | H06-058218 A | 3/1994 |
| JP | H08-267275 A | 10/1996 |
| JP | 2015-040307 A | 3/2015 |
| WO | 2016/052445 A1 | 4/2016 |

OTHER PUBLICATIONS

International Search Report and English Translation, PCT/JP2018/041711 dated Jan. 22, 2019, 2 pgs.
Extended European Search Report dated Sep. 21, 2021 for European Patent Application No. 18906862.0.

*Primary Examiner* — Brian D Walck
(74) *Attorney, Agent, or Firm* — Volpe Koenig

(57) ABSTRACT

The purpose of the present invention is to provide an alloy product which has both of high corrosion resistance enough to withstand severe corrosive/high-temperature environments and mechanical properties equivalent to or better than those of stainless steel, and which can be produced at lower cost than a Ni-based alloy. The Cr—Fe—Ni-based alloy product of the present invention is a product produced using a Cr—Fe—Ni-based alloy containing Cr as a largest-content component, wherein the product has such a microstructure that a dual-phase structure having a ferrite phase and an austenite phase coexisting therein serves as a matrix phase and an $L1_2$-type Ni-based intermetallic compound phase is dispersed and precipitated in the austenite phase.

12 Claims, 5 Drawing Sheets

CR—FE—NI-BASED ALLOY PRODUCT

TECHNICAL FIELD

The present invention relates to a technique for an alloy having high corrosion resistance and high strength, more specifically a product produced using a chromium(Cr)-iron (Fe)-nickel(Ni)-based alloy.

BACKGROUND ART

Among various members used in internal combustion engines, those members which come into contact with fuels having various qualities or deteriorated lubricant oils or combustion gases (e.g., a member for fuel injection devices, a timing chain member, a member for exhaust gas recirculation devices) are required to have high corrosion resistance enough to withstand severe corrosive environments and high-temperature environments and high mechanical properties. As a material that can meet these requirements, a martensitic stainless steel, which has excellent corrosion resistance and mechanical properties, has been used widely at present.

For example, PTL 1 (JP 6-58218 A) discloses a highly corrosion-resistant fuel injection device provided with a nozzle body which has a fuel injection hole and a valve which can slide in a guide hole formed in the nozzle body, wherein the fuel injection hole can be opened/closed in response to the movement of the valve in the direction of the axis of the nozzle body, the device being characterized in that at least one of the valve and at least an injection hole sheet part in the nozzle body on which the valve is to be seated is a cold-forging martensitic stainless steel containing, in % by weight, 0.1 to 0.5% of C, 12 to 18% of Cr, 0.5 to 1.5% of Mo, 0.03 to 1.0% of Si, 0.03 to 0.75% of Mn, with the remainder made up by Fe and unavoidable impurities.

PTL 2 (JP 2015-40307 A) discloses a high-hardness martensitic stainless steel having excellent corrosion resistance to an organic acid, the martensitic stainless steel being characterized by containing, in % by mass, 0.60 to 0.75% of C, 0.05 to 0.30% of Si, 0.01 to 0.30% of Mn, 10.00 to 12.00% of Cr, 0.10 to 2.00% of Cu, with the remainder made up by Fe and unavoidable impurities.

CITATION LIST

Patent Literatures

PTL 1: JP 6-58218 A
PTL 2: JP 2015-40307 A

SUMMARY OF INVENTION

Technical Problem

According to PTL 1, the sheet part and the valve are never eroded or damaged by a highly corrosive fuel such as a gasoline-alcohol mixed fuel, and therefore it is possible to provide a fuel injection device having high durability and reliability. According to PTL 2, it is possible to provide a high-hardness martensitic stainless steel which can exhibit excellent resistance to formic acid and acetic acid even in deteriorated gasoline environments when used in an automotive fuel injection pump member or the like that is used under high-pressure environments or the like.

In recent years, internal combustion engines having higher efficiency than before have been developed through the progression of fuel control techniques. However, the research/development for achieving further higher efficiency has been growing intense. For the members to be used in the internal engines, higher corrosion resistance and higher mechanical properties than before have also been demanded with the progress of the above-mentioned research/development.

In a martensitic stainless steel, the increase in the content of component carbon is effective for the improvement of the mechanical properties of the martensitic stainless steel. In this case, however, the corrosion resistance of the martensitic stainless steel is deteriorated disadvantageously. On the other hand, as a metallic material having both of excellent corrosion resistance and excellent mechanical properties, a nickel-based alloy is known. However, a nickel-based alloy has a disadvantage that the cost for materials thereof is very expensive.

In the research/development of metal members, to meet requirements for various demanded properties is an essential factor. Accordingly, the provision of such metal members at low costs is one of top priority issues from the viewpoint of the realization of practical and commercial use of the members.

Thus, the object of the present invention is to provide an alloy product which has both of high corrosion resistance enough to withstand severe corrosive/high-temperature environments and mechanical properties equivalent to or better than those of a martensitic stainless steel, and which can be produced at lower cost than a nickel-based alloy.

Solution to Problem

One aspect of the present invention provides a Cr—Fe—Ni-based alloy product which is a product produced using a Cr—Fe—Ni-based alloy containing Cr as a largest-content component,
wherein the product has such a microstructure that a dual-phase structure having a ferrite phase and an austenite phase coexisting therein serves as a matrix phase and an $L1_2$-type Ni-based intermetallic compound phase is dispersed and precipitated in the austenite phase.

In the Cr—Fe—Ni-based alloy product of the present invention, the following modifications and changes can be added.

(i) The Ni-based intermetallic compound phase comprises an $Ni_3Al$ phase and/or an $Ni_3(Al,Ti)$ phase.

(ii) The chemical composition of the Cr—Fe—Ni-based alloy contains
44 to 75% by mass inclusive of Cr,
10 to 33% by mass inclusive of Fe,
10 to 40% by mass inclusive of Ni,
0.05 to 2% by mass inclusive of Mn (manganese),
0.05 to 1% by mass inclusive of Si (silicon),
0.5 to 5% by mass inclusive of Al (aluminum),
more than 0% by mass and 0.1% by mass or less of C (carbon),
more than 0% by mass and 2% by mass or less of N (nitrogen),
more than 0% by mass and 0.2% by mass or less of O (oxygen),
more than 0% by mass and 0.04% by mass or less of P (phosphorus), and
more than 0% by mass and 0.01% by mass or less of S (sulfur); and the occupancy of the ferrite phase in the microstructure in the product is 60% by area or more.

(iii) The Cr—Fe—Ni-based alloy further contains at least one of Ti (titanium) in an amount of more than 0% by mass and 4% by mass or less and Cu (copper) in an amount of more than 0% by mass and 2% by mass or less as an optional auxiliary component. The term "optional auxiliary component" as used herein refers to a component which may be contained or may not be contained.

(iv) The product is a cast molded body having a cast structure.

(v) The product is a recrystallized molded body having a recrystallized structure.

(vi) The product is a rapidly solidified body having a rapidly solidified structure.

(vii) The rapidly solidified body is a composite body in which a coating layer composed of a Cr—Fe—Ni-based alloy and having the rapidly solidified structure is formed on a base.

(viii) The product is a powder metallurgically molded body having a sintered structure.

(ix) The room-temperature Vickers hardness is 650 Hv or more, the high-temperature Vickers hardness at 800° C. is 320 Hv or more, and the tensile strength at 700° C. is 650 MPa or more when a high-temperature tensile test is carried out in accordance with JIS G 0567.

(x) The product is a powder having a rapidly solidified structure.

(xi) The average mass loss rate is less than 0.1 g/(m$^2$·h) when a sulfuric acid corrosion test is carried out in accordance with JIS (Japanese Industrial Standards) G 0591.

Advantageous Effects of Invention

According to the present invention, a Cr—Fe—Ni-based alloy product can be produced, which has both of high corrosion resistance enough to withstand severe corrosive/high-temperature environments and mechanical properties equivalent to or better than those of a martensitic stainless steel, and which can be produced at lower cost than a Ni-based alloy.

DESCRIPTION OF EMBODIMENTS

Figure 1:
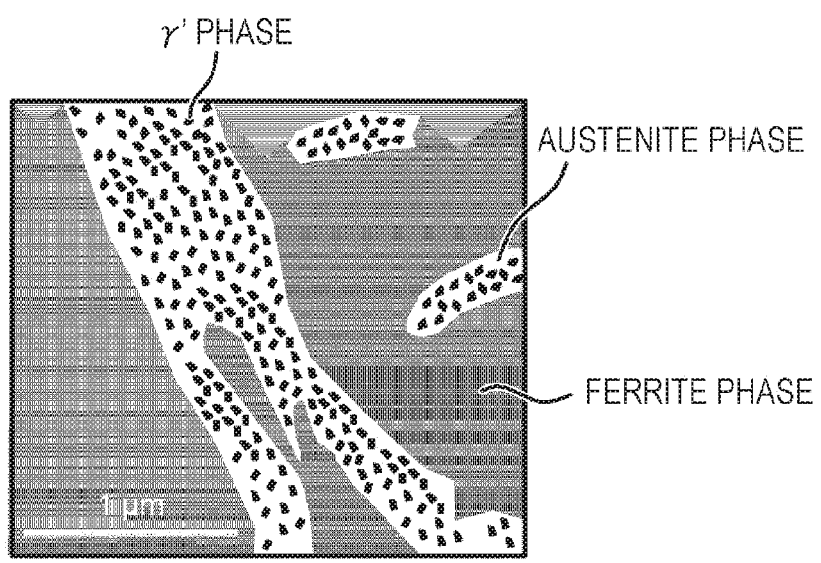
FIG. 1 is a schematic view of an example of the microstructure of a polished front surface of a molded body which is casted and then subjected to a structure control heat treatment and is an example of the Cr—Fe—Ni-based alloy product according to the present invention.

The present inventors have made intensive and extensive studies on the relationship among the chemical composition, the form of the metallic structure, the mechanical properties and corrosion resistance in a product using a Cr—Fe—Ni-based alloy containing Cr, Fe and Ni as the main components, particularly a Cr—Fe—Ni-based alloy containing Cr in an amount of 44% by mass or more. As a result, the present invention is accomplished.

Hereinbelow, the embodiments of the present invention will be described specifically with reference to the drawings attached. The present invention is not limited to the embodiments mentioned in this section, and can be appropriately combined with publicly known techniques or can be modified on the basis of publicly known techniques without departing from the technical spirit of the invention. In the description, in the same state as each other or the same production steps as each other, the same reference symbol may be applied so as to avoid the repetition of the statement for the state or the production step.

[Chemical Composition of Cr—Fe—Ni-Based Alloy of the Present Invention]

As mentioned above, the alloy according to the present invention is a Cr—Fe—Ni-based alloy containing Cr, Fe and Ni as the main components and also containing Mn, Si and Al as essential auxiliary components. As an optional auxiliary component, at least one of Ti and Cu may be further contained. The alloy contains C, N, O, P and S as unavoidable components. Hereinbelow, the composition (components) for the Cr—Fe—Ni-based alloy to be used in the present invention will be described.

(Main Components)

Cr: 44 to 75% by Mass Inclusive

Component Cr is one of the main components for the Cr—Fe—Ni-based alloy, and is a component contributing to the formation of a ferrite phase having high corrosion resistance and also contributing to the improvement in corrosion resistance in an austenite phase. The content of the component Cr is preferably 44 to 75% by mass inclusive, more preferably 47 to 70% by mass inclusive, still more preferably 50 to 65% by mass inclusive. If the Cr content is less than 44% by mass, the corrosion resistance and mechanical properties (e.g., ductility, toughness) of the Cr—Fe—Ni-based alloy product may become insufficient. If the Cr content is more than 75% by mass, the mechanical properties of the Cr—Fe—Ni-based alloy product may be deteriorated.

From the viewpoint of corrosion resistance and cost of materials, it is preferred that the component Cr, among the three main components (Cr, Fe and Ni), is contained in a largest content. In other words, because the Cr—Fe—Ni-based alloy of the present invention contains Cr, which is more inexpensive than Ni, as a largest-content component, the alloy has both of the advantage that the material cost is reduced compared with an Ni-based alloy containing Ni as a largest-content component and the advantage that corrosion resistance equivalent to or better than that of the Ni-based alloy can be secured.

Fe: 10 to 33% by Mass Inclusive

Component Fe is also one of the main components of the Cr—Fe—Ni-based alloy, and is a basic component for securing good mechanical properties. The content of the component Fe is preferably 10 to 33% by mass inclusive, more preferably 12 to 28% by mass inclusive, still more preferably 14 to 23% by mass inclusive. If the Fe content is less than 10% by mass, the mechanical properties of the Cr—Fe—Ni-based alloy product may become insufficient. If the Fe content is more than 33% by mass, a brittle σ phase (an intermetallic compound phase mainly composed of a FeCr phase) is more likely to be generated at temperatures around 800° C. and the ductility and toughness of the Cr—Fe—Ni-based alloy product may be deteriorated significantly (i.e., so-called "σ-phase embrittlement). In other words, by adjusting the content of Fe to a value ranging from 10 to 33% by mass, the σ-phase embrittlement in the Cr—Fe—Ni-based alloy product can be prevented and, as a result, good mechanical properties can be secured.

Ni: 10 to 40% by Mass Inclusive

Component Ni is also one of the main components for the Cr—Fe—Ni-based alloy, and is a component contributing to the formation of an austenite phase and also contributing to the improvement in ductility and toughness in a ferrite phase. In addition, the component Ni is a component which can combine with the component Al to produce an $L1_2$-type Ni-based intermetallic compound phase (e.g., an $Ni_3Al$ phase and/or an $Ni_3(Al,Ti)$ phase) and, therefore, can contribute to the improvement in the mechanical properties (particularly mechanical strength and hardness) of the Cr—Fe—Ni-based alloy product. The content of the component Ni is preferably 10 to 40% by mass inclusive, more preferably 15 to 35% by mass inclusive, still more preferably 20 to 30% by mass inclusive. If the Ni content is less than 10% by mass, the production/precipitation of the Ni-based intermetallic compound phase may become insufficient and, as a result, the effect to improve the mechanical properties of the Cr—Fe—Ni-based alloy product may also become insufficient. If the Ni content is more than 40% by mass, the mechanical properties (particularly hardness) of the Cr—Fe—Ni-based alloy product may also be deteriorated.

Fe+Ni: 30 to 54% by Mass Inclusive

The total content of the component Fe and the component Ni is preferably 30 to 54% by mass inclusive, more preferably 32 to 52% by mass inclusive, still more preferably 35 to 50% by mass inclusive. If the total content is less than 30% by mass, the mechanical properties of the Cr—Fe—Ni-based alloy product may become insufficient. If the total content is more than 54% by mass, the corrosion resistance and mechanical properties of the Cr—Fe—Ni-based alloy product may become insufficient.

From the viewpoint of mechanical properties and corrosion resistance in a high-temperature environment, it is preferred that the content of the component Ni is larger than that of the component Fe.

(Essential Auxiliary Components)

Mn: 0.05 to 2% by Mass Inclusive

Component Mn is one of the essential auxiliary components for the Cr—Fe—Ni-based alloy, and is a component which can combine with sulfur or oxygen to form microparticles of the resultant compound and therefore can trap/stabilize impurity components (i.e., can be involved in the desulfurization/deoxidization) and, as a result, can contribute to the improvement in the mechanical properties of the alloy product and the improvement in the resistance to carbon dioxide gas-induced corrosion of the alloy product. The content of the component Mn is preferably 0.05 to 2% by mass inclusive, more preferably 0.2 to 2% by mass inclusive, still more preferably more than 1% by mass and 2% by mass or less. If the Mn content is less than 0.05% by mass, the function/effect associated with the component Mn cannot be achieved satisfactorily. If the Mn content is more than 2% by mass, coarse particles of a sulfide (e.g., MnS) may be formed and the deterioration in the corrosion resistance or mechanical properties of the alloy product may be caused.

Si: 0.05 to 1% by Mass Inclusive

Component Si is also one of the essential auxiliary components for the Cr—Fe—Ni-based alloy, and is a component which can combine with oxygen to form microparticles of the resultant compound and therefore can trap/stabilize impurity components (i.e., can be involved in the deoxidization) and, as a result, can contribute to the improvement in mechanical properties of the alloy product. The content of the component Si is preferably 0.05 to 1% by mass inclusive, more preferably 0.1 to 0.9% by mass inclusive, still more preferably 0.3 to 0.8% by mass inclusive. If the Si content is less than 0.05% by mass, the function/effect associated with the component Si cannot be achieved satisfactorily. If the Si content is more than 1% by mass, coarse particles of an oxide (e.g., $SiO_2$) may be formed and, as a result, the deterioration in the mechanical properties of the alloy product may be caused.

Al: 0.5 to 5% by Mass Inclusive

Component Al is also one of the essential auxiliary components for the Cr—Fe—Ni-based alloy, and is a component which can combine with the component Ni to form microparticles of an $L1_2$-type Ni-based intermetallic compound phase (e.g., an $Ni_3Al$ phase and/or an $Ni_3(Al,Ti)$ phase, which is also sometimes referred to as a "γ' (gamma prime) phase) and, as a result, can contribute to the improvement in the mechanical properties (particularly mechanical strength at higher temperatures) of the Cr—Fe—Ni-based alloy product. The content of the component Al is preferably 0.5 to 5% by mass inclusive, more preferably 1 to 4% by mass inclusive, still more preferably 1.5 to 3% by mass inclusive. If the Al content is less than 0.5% by mass, the formation of the $L1_2$-type Ni-based intermetallic compound phase may be reduced and therefore the effect to improve the mechanical properties of the alloy product may become insufficient. If the Al content is more than 5% by mass, coarse particles of an oxide or a nitride (e.g., $Al_2O_3$ and AlN) may be formed and, as a result, the mechanical properties of the alloy product may be deteriorated.

C: More than 0% by Mass and 0.1% by Mass or Less

Component C is a component which can be made into a solid solution in the matrix phase to exert a function/effect to harden the alloy. The component C is also an impurity component which may deteriorate the corrosion resistance or the mechanical properties of the alloy product when combines with a component constituting the Cr—Fe—Ni-based alloy to form coarse particles of a carbide (e.g., Cr carbide). These negative influences can be eliminated by adjusting the content of the component C to 0.1% by mass or less. The C content is more preferably 0.03% by mass or less.

N: More than 0% by Mass and 2% by Mass or Less

Component N is a component which can be made into a solid solution in the matrix phase or can combine with a component constituting the Cr—Fe—Ni-based alloy to form microparticles of a nitride (e.g., Cr nitride or Al nitride) and, as a result, can exert a function/effect to improve the mechanical properties (e.g., hardness). The component N is also an impurity component which may deteriorate the mechanical properties (e.g., ductility and toughness) of the alloy product if forms coarse particles of a nitride. These negative influences can be eliminated by adjusting the content of the component N to 2% by mass or less.

In the case where importance is attached to corrosion resistance, the N content is more preferably more than 0% by mass and 0.1% by mass or less, still more preferably more than 0% by mass and 0.02% by mass or less. In the case where more importance is attached to mechanical strength, the N content is more preferably more than 0.02% by mass and 2% by mass or less, still more preferably more than 0.06% by mass and 2% by mass or less, particularly preferably more than 0.2% by mass and 2% by mass or less.

O: More than 0% by Mass and 0.2% by Mass or Less

Component O is a component which can combine with a component constituting the Cr—Fe—Ni-based alloy to form microparticles of an oxide (e.g., Fe oxide, Si oxide, Al oxide) and, as a result, can exert a function/effect to improve the mechanical properties (e.g., hardness). The component O is also an impurity component which may deteriorate the mechanical properties (e.g., ductility, toughness) of the alloy product if forms coarse particles of the oxide. These negative influences can be eliminated by adjusting the content of the component O to 0.2% by mass or less.

In the case where more importance is attached to corrosion resistance, the O content is more preferably more than 0% by mass and 0.05% by mass or less, still more preferably more than 0% by mass and 0.03% by mass or less. In the case where more importance is attached to mechanical strength, the O content is more preferably more than 0.05% by mass and 0.2% by mass or less, still more preferably more than 0.07% by mass and 0.2% by mass or less.

(Impurities)

Impurities in the Cr—Fe—Ni-based alloy include P and S. Hereinbelow, the impurities will be described.

P: More than 0% by Mass and 0.04% by Mass or Less

Component P is an impurity component which is likely to be segregated on grain boundaries in the Cr—Fe—Ni-based alloy and, as a result, may deteriorate the mechanical properties of the alloy product and the corrosion resistance at the grain boundaries. These negative influences can be eliminated by adjusting the content of the component P to 0.04% by mass or less. The P content is more preferably 0.03% by mass or less.

S: More than 0% by Mass and 0.01% by Mass or Less

Component S is an impurity component which is likely to combine with a component constituting the Cr—Fe—Ni-based alloy to form a sulfide having a relatively low melting point (e.g., Fe sulfide, Mn sulfide) and, as a result, may deteriorate the mechanical properties and pitting corrosion resistance of the alloy product. These negative influences can be eliminated by adjusting the content of the component S to 0.01% by mass or less. The S content is more preferably 0.003% by mass or less.

(Optional Auxiliary Components)

The optional auxiliary component in the Cr—Fe—Ni-based alloy includes one or more of Ti and Cu. As mentioned above, the term "optional auxiliary component" as used herein refers to a component which may be contained or may not be contained. Namely, the content of the optional auxiliary component may be 0% by mass. Hereinbelow, the optional auxiliary component will be described.

Ti: More than 0% by Mass and 4% by Mass or Less

Component Ti is one of the optional auxiliary components in the Cr—Fe—Ni-based alloy, and is a component which can combine with the component Ni and the component Al to form microparticles of an $\gamma'$ phase (an $L1_2$-type Ni-based intermetallic compound phase, e.g., an $Ni_3(Al,Ti)$ phase) and, as a result, can contribute to the improvement in the mechanical properties (particularly mechanical strength and hardness) of the alloy product. The component Ti is also a component which can combine with carbon, nitrogen or oxygen to form microparticles of the resultant compound and, as a result, can trap/stabilize the impurity component (i.e., can be involved in the decarbonization, denitrogenation or deoxidization).

In the case where the component Ti is contained, the content of the component Ti is preferably more than 0% by mass and 4% by mass or less, more preferably 0.5 to 3.5% by mass inclusive, still more preferably 1 to 3% by mass inclusive. When the Ti content is 0 to 0.5% by mass exclusive, decarbonization, denitrogenation or deoxidization is the main function/effect of the component Ti. When the Ti content is 0.5% by mass or more, the function/effect associated with the formation of the $\gamma'$ phase becomes remarkable. If the Ti content is more than 4% by mass, a $DO_{24}$-type Ni-based intermetallic compound phase (e.g., an $Ni_3Ti$ phase, which is also sometimes referred to as a "η phase") may be likely to be precipitated and, as a result, the mechanical properties of the alloy product may be deteriorated.

Cu: More than 0% by Mass and 2% by Mass or Less

Component Cu is one of the optional auxiliary components of the Cr—Fe—Ni-based alloy, and is a component which can contribute to the improvement in the corrosion resistance of the alloy product. When the component Cu is added, the content thereof is preferably more than 0% by mass and 2% by mass or less, more preferably 0.1 to 1.5% by mass inclusive, still more preferably 0.1 to 1% by mass inclusive. When the Cu content is 0 to 0.1% by mass exclusive, the function/effect associated with the component Cu hardly appears clearly (in this case, any special trouble does not occur). If the Cu content is more than 2% by mass, a Cu precipitate is likely to be produced in the ferrite phase and, as a result, the mechanical properties (e.g., ductility, toughness) of the alloy product may be deteriorated.

[Microstructure of Cr—Fe—Ni-Based Alloy Product of the Present Invention]

Hereinbelow, the microstructure (also referred to as "metallic structure") of the Cr—Fe—Ni-based alloy product according to the present invention will be described.

In general, the microstructure of an alloy containing Fe as the main component is roughly classified into: a ferrite structure (also referred to as a "ferrite phase" or an "α phase") which has a crystal structure of a face-centered cubic lattice; an austenite structure (also referred to as an "austenite phase" or a "γ phase") having a crystal structure of a face-centered cubic lattice; and a martensite structure (also referred to as a "martensite phase" or an "α' phase") having a crystal structure of a distorted body-centered cubic lattice.

The ferrite phase in the Cr—Fe—Ni-based alloy product of the present invention is a ferrite phase having a high Cr content (hereinafter, also sometimes simply referred to as a "Cr-rich ferrite phase" or a "ferrite phase"), and is considered to have excellent corrosion resistance (e.g., SCC resistance) and high mechanical strength (e.g., tensile strength, hardness) but have relatively poorer ductility/toughness compared with the austenite phase. The austenite phase is considered to have relatively higher ductility/toughness but have relatively poor mechanical strength compared with the ferrite phase. It is also considered that high corrosion resistance can be exerted under normal environments but the SCC resistance is rapidly deteriorated under severe corrosive environments.

When the alloy product of the present invention is processed into a member and the member is used, the alloy product has such a microstructure that a dual-phase structure having a Cr-rich ferrite phase (α phase) and an austenite phase (γ phase) coexisting therein serves as a matrix phase and an $L1_2$-type Ni-based intermetallic compound phase (γ' phase, an $Ni_3Al$ phase and/or an $Ni_3(Al,Ti)$ phase) is dispersed and precipitated in the austenite phase (γ phase). Since the matrix phase structure is a dual-phase structure composed of an α phase and a γ phase, the advantages of the Cr-rich ferrite phase (i.e., excellent corrosion resistance including SCC resistance, high mechanical strength) and the advantages of the austenite phase (i.e., excellent ductility/toughness) can be exerted in a balanced manner. Furthermore, since the γ' phase is precipitated/dispersed in the austenite phase (γ phase), a precipitation-enhancing function/effect can also be exerted.

In the alloy product of the present invention, the occupancy of the ferrite phase (also sometimes simply referred to as a "ferrite ratio", hereinafter) is preferably 60% by area or more, more preferably 70% by area or more, still more preferably 80% by area or more, from the viewpoint of mechanical strength. The remainder (i.e., 40% by area or less) is preferably made up by the austenite phase and the γ' phase.

The term "occupancy of a phase" as used herein is defined as the content (unit: % by area) of the phase when a polished surface of an alloy bulk sample is subjected to an electron backscatter diffraction (EBSP) analysis, or the content (unit: % by area) of the phase when an image of the polished surface of the alloy bulk sample which is observed with a scanning electron microscope (SEM) is subjected to an image analysis using an image processing software (ImageJ, a public domain software developed by National Institutes of Health (NIH)).

In this regard, it is desirable that a phase other than the ferrite phase, the austenite phase and the γ' phase (e.g., a heterophase such as an σ phase or a η phase) is not detected in the alloy product. However, the presence of the phase is acceptable as long as the content of the phase falls within such a range that the mechanical properties or the corrosion resistance cannot be adversely affected (e.g., the total occupancy of the heterophase(s) is 3% by area or less).

The alloy product has the following favorable characteristic property: the occupancy of each of the phases is altered (i.e., the occupancy of the austenite phase increases and the occupancy of the ferrite phase and the γ' phase decrease) to improve processability of the alloy product when the alloy product is subjected to a specific annealing heat treatment, and the occupancies of the ferrite phase and the γ' phase can increase (i.e., the occupancy of the austenite phase decreases) to improve the mechanical strength of the alloy product when the alloy product is processed into a final shape and then subjected to a specific structure control heat treatment.

The alloy product is not particularly limited with respect to the metallic structure (i.e., the microstructure determined on the basis of the forms of crystal grains) associated with the production method to be employed, and the metallic structure may be a cast structure, a rapidly solidified structure, or a sintered structure. Alternatively, the metallic structure may be a metallic structure that has undergone a solution heat treatment or a structure control heat treatment (e.g., a recrystallized structure).

From the viewpoint of mechanical properties and corrosion resistance, it is advantageous for the alloy product to have a metallic structure in which the crystal grain diameters of the ferrite phase and the austenite phase are small (e.g., a rapidly solidified structure, a sintered structure). More specifically, the average crystal grain diameter is preferably 40 μm or less, more preferably 30 μm or less, still more preferably 20 μm or less.

As the average crystal grain diameter of each of the ferrite phase and the austenite phase in the present invention, an average crystal grain diameter analyzed and calculated by the conventional image processing technique on an observed image of the microstructure can be employed. For example, a light microscopic observation image or an electron microscopic observation image (an observation image having an area of viewing field of 100 μm×100 μm or larger) of a polished surface of an alloy bulk sample is read in an image analysis software (e.g., ImageJ) to analyze the average area of crystal grains in the viewing field, and the diameter of a circle having an area equivalent to the average area is calculated as the average crystal grain diameter.

FIG. 1 is a schematic view illustrating an example of the microstructure of a polished front surface of a molded body which is casted and then subjected to a structure control heat treatment and which is an example of the Cr—Fe—Ni-based alloy product according to the present invention. The schematic view shown in FIG. 1 is produced on the basis of an SEM observation image. As shown in FIG. 1, it is confirmed that the molded body has such a microstructure that a dual-phase structure having a ferrite phase (gray) and an austenite phase (white) coexisting therein serves as a matrix phase and a γ' phase (black) is precipitated/dispersed in the austenite phase. The average crystal grain diameter in each of the ferrite phase and the austenite phase is measured separately, and it is confirmed that the average crystal grain diameter is 40 μm or less.

[Method for Producing Cr—Fe—Ni-Based Alloy Product of the Present Invention]

Next, the method for producing the Cr—Fe—Ni-based alloy product of the present invention will be described.

(Method for Producing Casted Material)

Figure 2:
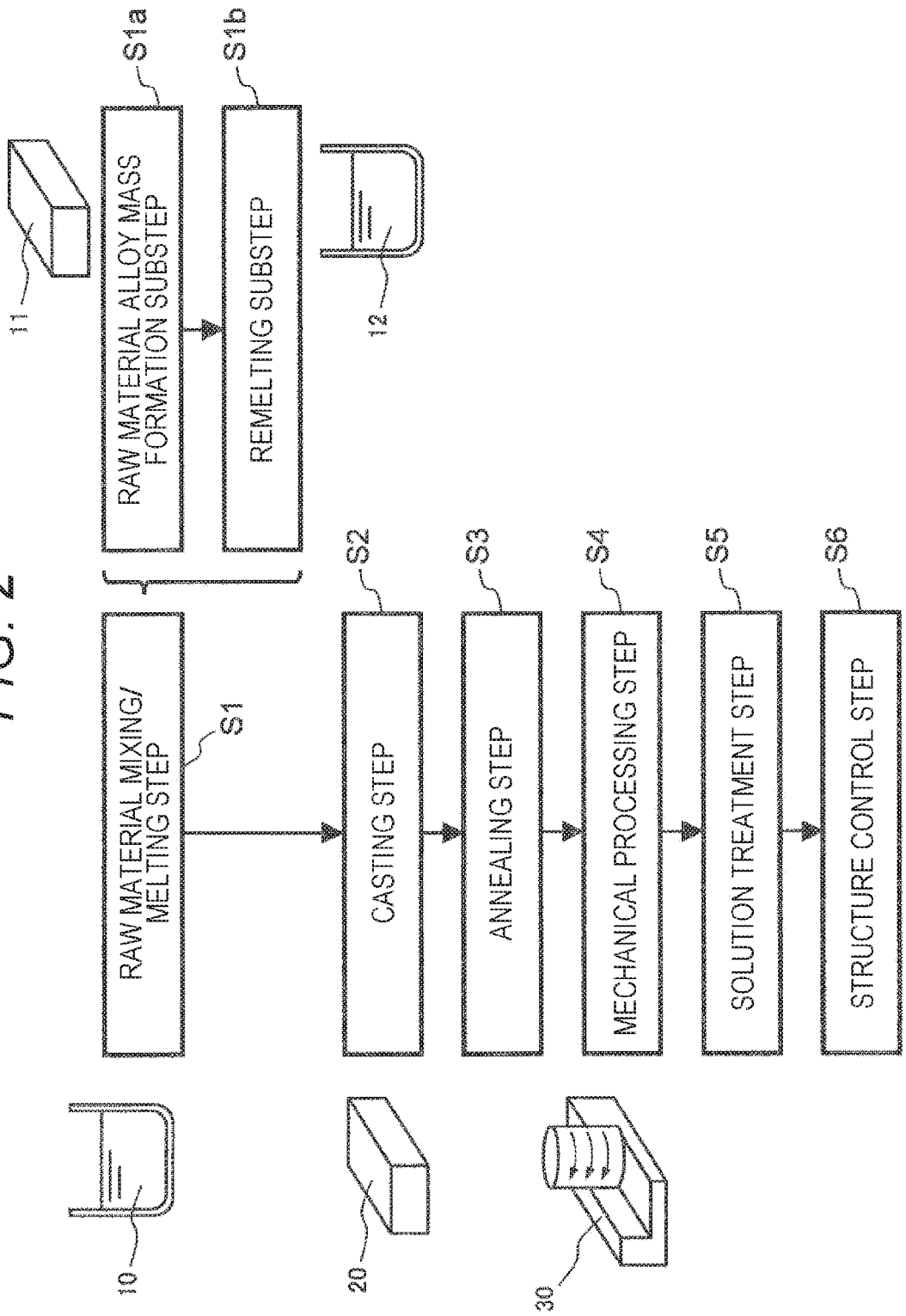
FIG. 2 is a process diagram illustrating a method for producing a casted material, which is an example of the method for producing the Cr—Fe—Ni-based alloy product according to the present invention.

FIG. 2 is a process diagram illustrating a method for producing a casted material, which is an example of the method for producing the Cr—Fe—Ni-based alloy product according to the present invention. As shown in FIG. 2, a raw material mixing/melting step (step 1: S1) is carried out, in which raw materials for a Cr—Fe—Ni-based alloy are mixed and melted together in such a manner that a desired composition (main components+essential auxiliary components+optional auxiliary components as required) can be achieved, thereby forming a molten metal 10. The method for mixing the raw material and the method for melting the raw material are not particularly limited, and the conventional methods employed in the production of a highly corrosion-resistant highly strong alloy can be employed.

In order to further decrease the contents of impurity components in the alloy (i.e., to refine the alloy), it is more preferred that the raw material mixing/melting step S1 comprises: a raw material alloy mass formation substep (step 1a: S1a) of mixing/melting the raw materials for the Cr—Fe—Ni-based alloy together to form a molten metal 10 and then solidifying the molten metal temporarily to form a raw material alloy mass 11; and a remelting substep (step 1b; S1b) of remelting the raw material alloy mass 11 to prepare a purified molten metal 12. The remelting method is not particularly limited, as long as the purity of the alloy can be increased. For example, vacuum arc remelting (VAR) or electro-slag remelting (ESR) can be employed preferably.

Subsequently, a casting step (step 2: S2) of casting the molten metal 10 using a given mold to form a cast molded body 20 is carried out. As mentioned above, in the case where the remelting step S1b is carried out, the casting step S2 is a step of casting the purified molten metal 12 to form the cast molded body 20.

In the case where the technique for the casting is precision casting (i.e., when it is intended to produce a cast molded body having a shape close to the shape of a final product), it is possible that the molten metal 10 of which the components are adjusted in the raw material mixing/melting step S1 is casted temporarily to prepare a large mother alloy mass, then the mother alloy mass is divided into pieces each having a proper size, then the pieces are remelted, and then the casting is carried out in a precision casting mold. In this case, from the viewpoint of the mechanical properties and corrosion resistance of the final product, it is preferred to secure a cooling rate at which the increase in the size of crystal grains (i.e., the formation of a coarse cast solidified structure) during solidification can be prevented.

In the case where the resultant cast molded body 20 is to be mechanically processed into a desired shape, it is possible to subject the cast molded body 20 to an annealing step (step 3: S3) of carrying out an annealing heat treatment at 750 to 900° C. inclusive prior to the mechanical processing. The annealing step S3 is not an essential step, but it is preferred to carry out this step from the viewpoint of the improvement in mechanical processability. When the annealing heat treatment is carried out in the above-mentioned temperature range, the occupancy of the austenite phase increases (i.e., the occupancy of the ferrite phase decreases) in the cast molded body 20 to improve the toughness and decrease the hardness (e.g., Vickers hardness of less than 600 Hv is achieved), thereby improving the mechanical processability of the cast molded body 20.

Subsequently, a mechanical processing step (step 4: S4) is carried out, in which the cast molded body 20 that has been subjected to the annealing heat treatment is mechanically processed into a desired shape, thereby forming a mechanically processed molded body 30. In the case where the mechanical processing is not carried out, step S4 may be skipped, as a matter of course. The term "mechanical processing" as used herein refers to a processing using a working machine for the purpose of shaping into a desired shape (e.g., cutting work, grinding work, electro-discharge machining, laser machining, water-jet machining).

Subsequently, a solution treatment step (step 5: S5) is carried out, in which the mechanically processed molded body 30 or the cast molded body 20 is subjected to a solution heat treatment at 1050 to 1250° C. inclusive. The temperature to be employed for the solution heat treatment is preferably higher by 150° C. or more than that employed for the above-mentioned annealing heat treatment. The solution treatment step S5 has a function/effect to uniformize the chemical composition in each of the ferrite phase and the austenite phase, and also serves as a pretreatment for the dispersion/precipitation of fine γ' phase particles in the subsequent step. In addition, when the solution heat treatment in the above-mentioned temperature range is carried out, the occupancy of the austenite phase can be further increased. When the solution heat treatment is carried out, a structure in which recrystallized crystal grains (i.e., a recrystallized structure) often appears in at least a part of the microstructure.

Subsequently, a structure control step (step 6: S6) is carried out, in which the mechanically processed molded body 30 is subjected to a structure control heat treatment at 600 to 900° C. inclusive. The structure control step S6 has a function/effect to restore the austenite phase that has been increased in the preceding step to a ferrite phase (i.e., to increase the ferrite ratio), and also has a function/effect to disperse/precipitate fine γ' phase grains in the austenite phase to improve the mechanical strength and hardness of the mechanically processed molded body 30 (e.g., a Vickers hardness of 650 $Hv_1$ or more can be achieved).

With this regard, a mechanical processing (e.g., polishing) may be carried out as a finish processing step subsequent to the structure control step S6. With respect to the finish processing step, the same procedure is applied to other products.

(Method for Producing Rapidly Solidified Material)

Figure 3:
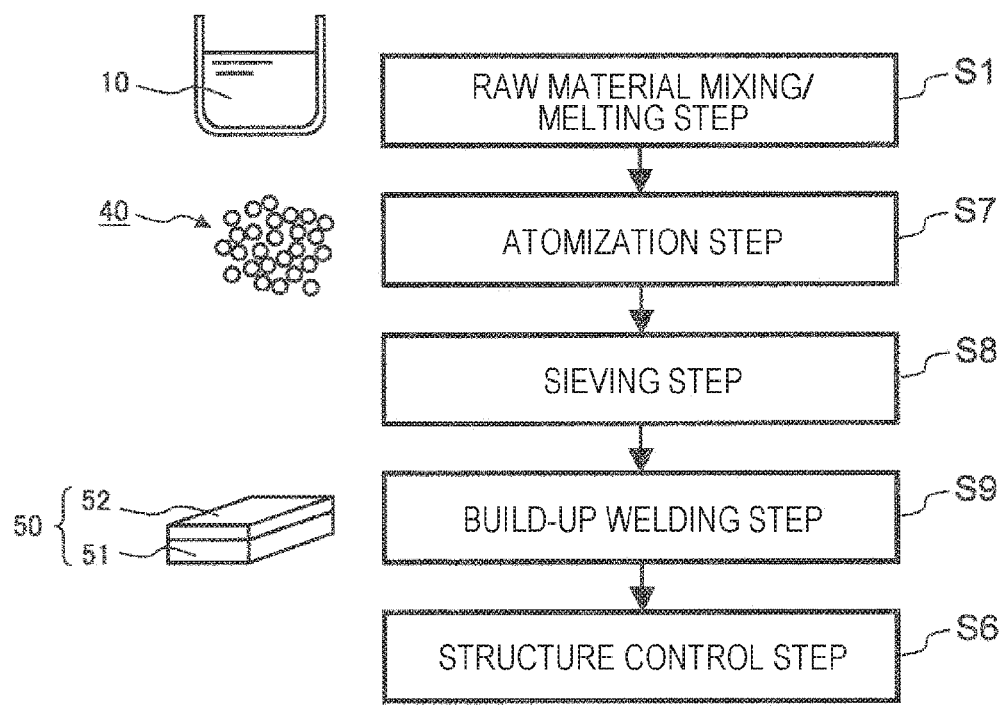
FIG. 3 is a process diagram illustrating a method for producing a rapidly solidified material, which is another example of the method for producing the Cr—Fe—Ni-based alloy product according to the present invention.

FIG. 3 is a process diagram illustrating a method for producing a rapidly solidified material, which is another example of the method for producing the Cr—Fe—Ni-based alloy product according to the present invention. In FIG. 3, a process for producing a powder and a build-up welded material is shown. In this drawing, for simplification purpose, the descriptions of a raw material alloy mass formation substep S1a and a remelting substep S1b are omitted. However, as a matter of course, these substeps may be carried out.

As shown in FIG. 3, the method for producing a rapidly solidified material (in this case, a powder and a build-up welded material) is the same as the method for producing a casted material shown in FIG. 2 with respect to the matter that the same raw material mixing/melting step S1 is carried out, and is different from the method for producing a casted material shown in FIG. 2 with respect to the matter that an atomization step (step 7: S7), a sieving step (step 8: S8) and a build-up welding step (step 9: S9) are carried out in place of the casting step S2 through the solution treatment step S5. Then, the atomization step S7 through the build-up welding step S9 will be described.

By carrying out the atomization step S7, a rapidly solidified alloy powder 40 of the Cr—Fe—Ni-based alloy can be produced from the molten metal 10 or the purified molten metal 11. The atomization method is not particularly limited, and any one of the conventional atomization methods can be employed. For example, for the production of a powder to be built up, a gas atomization method can be employed, by which spherical particles each having high purity and a uniform composition can be produced. For powder metallurgy, a water atomization method can be employed, by which a powder having irregular shapes can be produced.

Subsequent to the atomization step S7, a sieving step S8 may be carried out for adjusting the particle diameters of the rapidly solidified alloy powder 40 to desired values. The sieving step S8 is not an essential step, but it is preferred to carry out this step from the viewpoint of the improvement in the usability of the rapidly solidified alloy powder 40. The particle diameters to be achieved by the sieving is not particularly limited, and it is preferred to sieve the rapidly solidified alloy powder 40 in such a manner that an average particle diameter of 10 to 200 μm inclusive can be achieved from the viewpoint of handling properties. The rapidly solidified alloy powder 40 thus produced can be used suitably as, for example, a welding material, a powder metallurgy material and a laminate-forming material.

Subsequently, a build-up welding step S9 is carried out on a desired base 51 using the rapidly solidified alloy powder 40. In this manner, a build-up welded material 50 in which an alloy coating layer 52 having a rapidly solidified structure is formed on the base 51 can be produced. In the present invention, the build-up welding step S9 includes thermal spraying using a metal powder.

Subsequent to the build-up welding step S9, a structure control step S6 may be carried out. The structure control step S6 for the build-up welded material 50 is not an essential step. However, it is preferred to carry out the structure control step S6 (e.g., a structure control heat treatment at 600 to 700° C.) from the viewpoint of the control of the mechanical properties of the build-up welded material 50 (e.g., the control of the hardness of the alloy coating layer 52, the relaxation of an internal strain in the build-up welded material 50 which is caused as the result of the rapid solidification).

(Method for Producing Powder Metallurgy Material)

Figure 4:
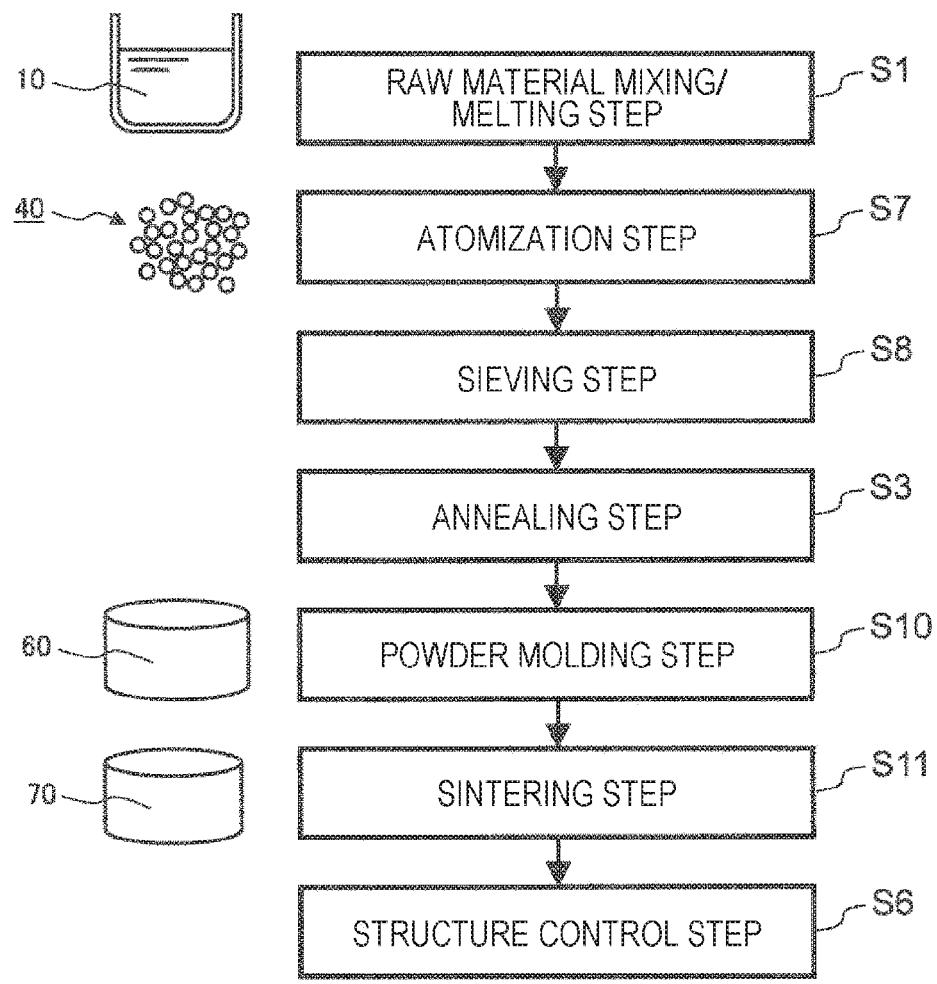
FIG. 4 is a process diagram illustrating a method for producing a powder metallurgy material, which is another example of the method for producing the Cr—Fe—Ni-based alloy product according to the present invention.

FIG. 4 is a process diagram illustrating a method for producing a powder metallurgy material, which is another example of the method for producing the Cr—Fe—Ni-based alloy product according to the present invention. In FIG. 4, a process for producing a powder sintered body is shown. In this drawing, for simplification purpose, the descriptions of a raw material alloy mass formation substep S1$a$ and a remelting substep Sb are omitted. However, as a matter of course, these substeps may be carried out.

As shown in FIG. 4, the method for producing a powder metallurgy material is the same as the method for producing a rapidly solidified material shown in FIG. 3 with respect to the matter that the same process through the atomization step S7 or the sieving step S8 is carried out, and is different from the method shown in FIG. 3 with respect to the matter that a powder molding step (step 10: S10) and a sintering step (step 11: S11) are carried out in place of the build-up welding step S9. Then, the powder molding step S10 and the sintering step S11 will be described.

By carrying out the powder molding step S10 using the rapidly solidified alloy powder 40, a powder molded body 60 of the Cr—Fe—Ni-based alloy, which has a desires shape, can be produced. The powder molding method is not particularly limited, and any one of the conventional metal powder molding methods can be employed. For example, press molding and injection molding can be employed preferably.

Subsequently, a sintering step S11 is carried out, in which the powder molded body 60 is subjected to a sintering heat treatment at 1000 to 1350° C. inclusive to form a powder sintered body 70. The sintering heat treatment is not particularly limited, and any one of the conventional methods can be employed. From the viewpoint of the densification of the powder sintered body 70, it is more preferred that the sintering heat treatment includes a hot isostatic pressing (HIP) treatment at a temperature of 1000° C. or higher and lower than the solidus temperature of the alloy at 500 to 3000 atm inclusive. In the sintering step S11, the temperature range overlaps the temperature range for the solution heat treatment. Therefore, the sintering step S11 also has a function/effect of the solution treatment step S5.

Subsequently, it is preferred to carry out a structure control step S6 of subjecting the powder sintered body 80 to a structure control heat treatment at 600 to 900° C. inclusive, as in the case of the above-mentioned other products.

[Cr—Fe—Ni-Based Alloy Product of the Present Invention]

Each of the Cr—Fe—Ni-based alloy products produced as mentioned above has mechanical properties equivalent to or better than those of a martensitic stainless steel and high corrosion resistance, and contains Cr, which is inexpensive compared with Ni, as a largest-content component. Therefore, each of the Cr—Fe—Ni-based alloy products can be reduced with respect to the cost compared with a Ni-based alloy product.

Consequently, the Cr—Fe—Ni-based alloy product of the present invention can be used suitably as various members for which high corrosion resistance enough to withstand severe corrosive/temperature environments and high mechanical properties are required. Examples of the member to be applied include: an automotive member (e.g., a fuel injection device member, a roller chain member, a turbo charger member, an engine exhaust gas system member, a bearing member); a rolling bearing or sliding bearing member (e.g., a linear bearing member, a wind turbine bearing, a water turbine bearing, a ventilating fan bearing member, a mixing drum bearing member, a compressor bearing member, an elevator bearing member, an escalator bearing member, a planetary exploration spacecraft rover bearing member); a construction equipment member (e.g., a caterpillar track member, a mixing drum member); a ship/submarine member (e.g., a screw member); an environmental equipment member (e.g., a garbage combustion furnace member); a member for bicycles, motor cycles and personal watercrafts (e.g., a roller chain member, a sprocket member); a mechanical processing device member (e.g., a mold, a compression roll, a cutting tool member); an oil well equipment member (e.g., a member (e.g., an axis, a bearing) for rotating machines (e.g., a compressor, a pump)); a seawater environment equipment member (e.g., a seawater desalination plant equipment member, an umbilical cable); a chemical plant equipment member (e.g., a liquefied natural gas vaporization device member); a power generating equipment-related member (e.g., a coal gasification device member, a heat-resistant piping member, a separator member for fuel cells, a fuel reforming equipment member); and a frame for umbrellas.

Figure 5A:
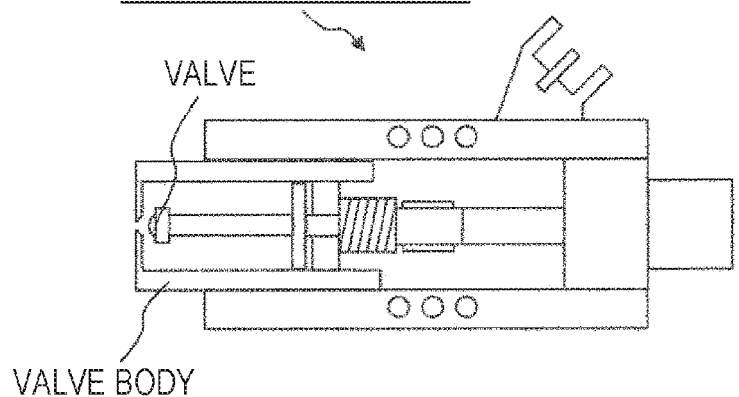
FIG. 5A is a schematic cross-sectional view of a fuel injection device for automotive engines, which is an example of the Cr—Fe—Ni-based alloy product according to the present invention and an industrial product utilizing the Cr—Fe—Ni-based alloy product.

FIG. 5A is a schematic cross-sectional view of a fuel injection device for automotive engines, which is an example of the Cr—Fe—Ni-based alloy product according to the present invention and an industrial product utilizing the Cr—Fe—Ni-based alloy product. In the fuel injection device, the Cr—Fe—Ni-based alloy product of the present invention can be used suitably as, for example, a valve and/or a valve body. The valve or the valve body can be produced in the form of, for example, a precisely casted material, a mechanically processed material or a powder metallurgy material.

Figure 5B:
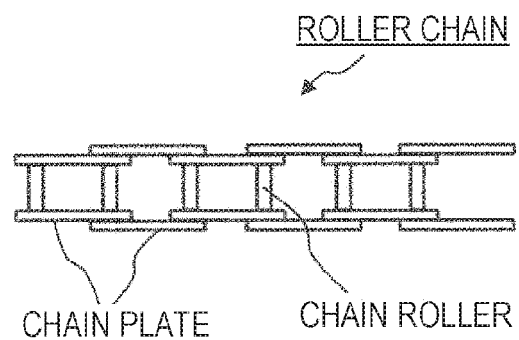
FIG. 5B is a schematic plan view of a roller chain, which is another example of the Cr—Fe—Ni-based alloy product according to the present invention and an industrial product utilizing the Cr—Fe—Ni-based alloy product.

FIG. 5B is a schematic plan view of a roller chain, which is another example of the Cr—Fe—Ni-based alloy product according to the present invention and an industrial product utilizing the Cr—Fe—Ni-based alloy product. In the roller chain, the Cr—Fe—Ni-based alloy product of the present invention can be used suitably as, for example, a chain plate and/or a chain roller. The chain plate or the chain roller can also be produced in the form of, for example, a precisely casted material, a mechanically processed material or a powder metallurgy material.

Figure 5C:
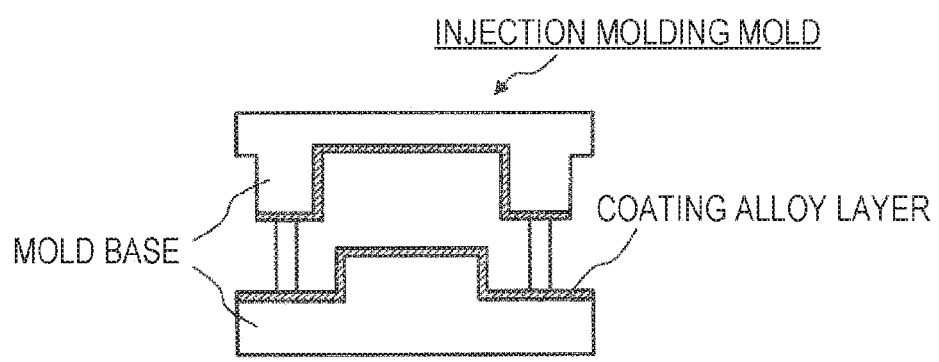
FIG. 5C is a schematic cross-sectional view of an injection molding mold, which is another example of the Cr—Fe—Ni-based alloy product according to the present invention and an industrial product utilizing the Cr—Fe—Ni-based alloy product.

FIG. 5C is a schematic cross-sectional view of an injection molding mold, which is another example of the Cr—Fe—Ni-based alloy product according to the present invention and an industrial product utilizing the Cr—Fe—Ni-based alloy product. In the injection molding mold, the Cr—Fe—Ni-based alloy product of the present invention can be used suitably as, for example, an alloy coating layer for the surface of a mold base. The alloy coating layer can be produced in the form of a build-up welded material.

EXAMPLES

Hereinbelow, the present invention will be described more specifically with reference to examples and comparative examples. It should be noted that the present invention is not limited to these examples.

comparative alloy CA-2 is a dual-phase stainless steel (a commercially available product) that is so-called "super duplex stainless steel", comparative alloy CA-3 is an Ni-based alloy (a commercially available product), and comparative alloy CA-4 is a Cr—Fe—Ni-based alloy having a composition out of the specification for the compositions of the present invention.

TABLE 1

Nominal chemical compositions for alloys of invention IA-10 to IA-11 and comparative alloys CA-1 to CA-4

| Alloy No. | Chemical composition (% by mass) | | | | | | | | | | | | | | |
|---|---|---|---|---|---|---|---|---|---|---|---|---|---|---|---|
| | Cr | Fe | Ni | Mn | Si | Al | Ti | Cu | Mo | Nb | C | N | O | P | S |
| IA-1 | 50.5 | 17.5 | 29.0 | 1.33 | 0.51 | 0.97 | — | 0.16 | — | — | 0.011 | 0.014 | 0.013 | 0.019 | 0.0014 |
| IA-2 | 54.2 | 18.6 | 21.0 | 0.90 | 0.05 | 0.93 | 3.70 | 0.60 | — | — | 0.010 | 0.014 | 0.020 | 0.015 | 0.0012 |
| IA-3 | 44.6 | 20.0 | 29.6 | 1.08 | 0.05 | 2.96 | 1.03 | 0.68 | — | — | 0.016 | 0.017 | 0.016 | 0.016 | 0.0018 |
| IA-4 | 47.6 | 15.9 | 29.0 | 0.90 | 0.47 | 2.00 | 4.00 | 0.18 | — | — | 0.015 | 0.016 | 0.017 | 0.015 | 0.0013 |
| IA-5 | 50.2 | 13.9 | 30.0 | 1.36 | 0.50 | 4.00 | — | — | — | — | 0.011 | 0.016 | 0.017 | 0.017 | 0.0017 |
| IA-6 | 53.9 | 15.0 | 25.0 | 1.37 | 0.53 | 1.00 | 3.00 | 0.18 | — | — | 0.016 | 0.017 | 0.016 | 0.016 | 0.0018 |
| IA-7 | 55.0 | 15.0 | 24.0 | 1.33 | 0.57 | 3.00 | 1.00 | — | — | — | 0.012 | 0.015 | 0.025 | 0.020 | 0.0014 |
| IA-8 | 51.0 | 15.0 | 26.0 | 1.42 | 0.53 | 3.00 | 3.00 | — | — | — | 0.012 | 0.013 | 0.029 | 0.021 | 0.0011 |
| IA-9 | 44.8 | 20.1 | 29.8 | 1.00 | 0.34 | 2.98 | 0.52 | 0.49 | — | — | 0.015 | 0.011 | 0.018 | 0.016 | 0.0014 |
| IA-10 | 50.3 | 14.5 | 29.8 | 0.56 | 0.19 | 3.07 | 1.07 | 0.51 | — | — | 0.011 | 0.014 | 0.019 | 0.017 | 0.0014 |
| IA-11 | 49.7 | 15.5 | 28.3 | 0.40 | 0.05 | 2.02 | 3.50 | 0.48 | — | — | 0.012 | 0.015 | 0.025 | 0.020 | 0.0014 |
| CA-1 | 19.0 | 70.5 | 9.0 | 0.74 | 0.39 | 0.010 | — | — | — | — | 0.32 | 0.024 | 0.023 | 0.011 | 0.0032 |
| CA-2 | 25.2 | 60.9 | 7.3 | 1.41 | 0.52 | 0.015 | — | 0.53 | 4.12 | — | 0.013 | 0.017 | 0.013 | 0.019 | 0.0024 |
| CA-3 | 18.6 | 18.7 | 52.1 | 0.39 | 0.53 | 0.51 | 0.97 | — | 2.95 | 5.21 | 0.024 | 0.017 | 0.013 | 0.009 | 0.0013 |
| CA-4 | 29.5 | 27.7 | 30.5 | 1.55 | 0.51 | 10.0 | — | 0.17 | — | — | 0.012 | 0.016 | 0.013 | 0.017 | 0.0017 |

—: indicating that component is not added intentionally

[Experiment 1]
(Preparation of Cast Molded Bodies Using Alloys of the Invention IA-1 to IA-9 and Comparative Alloys CA-1 to CA-4)

Raw materials were mixed together so as to meet a nominal chemical composition shown in Table 1, then the resultant mixture was melted by a high-frequency melting method (melting temperature: 1500° C. or higher, in a pressure-reduced Ar atmosphere) to form a molten metal (raw material mixing/melting step S1), and then the molten metal was casted to prepare a cast molded body (in this case, an ingot for mechanical processing use) (casting step S2).

(Preparation of Rapidly Solidified Alloy Powders Using Alloys of the Invention IA-10 to IA-11)

Raw materials were mixed and melted by a high-frequency melting method so as to meet a nominal chemical composition shown in Table 1 in the same manner as mentioned above to form a molten metal, and then the molten metal was solidified temporarily to prepare a raw material alloy mass (raw material alloy mass formation substep S1a). Subsequently, the raw material alloy mass was remelted by a vacuum arc remelting method (melting temperature: 1500° C. or higher) to form a purified molten metal (remelting substep S1b), and a rapidly solidified alloy powder was then prepared from the purified molten metal by a gas atomization method (atomization step S8). Subsequently, the rapidly solidified alloy powder was subjected to sieving step S9 to prepare a rapidly solidified alloy powder having an average particle diameter of 100 μm.

In Table 1, the content (unit; % by mass) of each of component shown therein is an amount that is converted in such a manner that the sum total of the contents of the components can become 100% by mass. Comparative alloy CA-1 is a stainless steel (a commercially available product),

[Experiment 2]
(Production of Alloy Products of the Invention IAP-1 to IAP-13 and Comparative Alloy Products CAP-1 to CAP-4)

Each of the cast molded bodies of IA-1 to IA-9 and CA-4 prepared in Experiment 1 was subjected to an annealing heat treatment (annealing step S3) at 750 to 900° C. Subsequently, the annealed cast molded body was mechanically processed into a desired shape. In this manner, mechanically processed molded bodies of IA-1 to IA-9 and CA-4 were prepared (mechanical processing step S4).

The cast molded bodies of CA-1 to CA-3 which were prepared in Experiment 1 were not subjected to annealing step S3 and were subjected to mechanical processing step S4 to prepare mechanically processed molded bodies of CA-1 to CA-3 which were molded in predetermined shapes.

Subsequently, each of the mechanically processed molded bodies of IA-1 to IA-9 and CA-3 to CA-4 was subjected to a solution heat treatment (retained at 1050 to 1250° C. for 1 hour and then cooled in air) (solution treatment step S5). The temperature to be employed for the solution heat treatment was higher by 150° C. or more than the temperature employed for the annealing heat treatment. The mechanically processed molded bodies of CA-1 to CA-2 were not subjected to solution treatment step S5.

Subsequently, each of samples of the mechanically processed molded bodies of IA-1 to IA-9 and CA-3 to CA-4 which had been subjected to solution treatment step S5 was subjected to a structure control heat treatment (retained at 600 to 900° C. for 1 hour and the cooled with an oil) (structure control step S6). The mechanically processed molded bodies of CA-1 to CA-2, which had not been subjected to solution treatment step S5, were subjected to a structure control heat treatment at temperatures that were respectively suitable for the corresponding alloys.

Through the above-mentioned process, alloy products for use in tests/evaluations (alloy products of the invention IAP-1 to IAP-13 and comparative alloy products CAP-1 to CAP-4) were produced.

(Production of Alloy Products of the Invention IAP-14 to IAP-15)

An alloy coating layer (thickness: 5 mm) was formed on an austenite stainless steel plate (SUS304 plate) by a powder plasma transfer arc welding method using the rapidly solidified alloy powder of IA-10, which was prepared in Experiment 1, to prepare an alloy-coated composite body (build-up welding step S10). The alloy-coated composite body thus prepared was divided into two pieces, and one of the pieces was named as an alloy product of the invention IAP-14. The other of the divided pieces of the alloy-coated composite body was subjected to a structure control heat treatment (retained at 600° C. for 1 hour and then cooled with an oil) (structure control step S6) to prepare an alloy product of the invention IAP-15.

(Production of Alloy Product of the Invention IAP-16)

The rapidly solidified alloy powder of IA-11, which was prepared in Experiment 1, was subjected to an annealing heat treatment at 750° C. (annealing step S3). Subsequently, the annealed rapidly solidified alloy powder was compression-molded to prepare a cylindrical powder molded body (outer diameter: 30 mm, height: 10 mm) (powder molding step S11). Subsequently, the powder molded body was subjected to a sintering heat treatment (retained at 1200° C. for 1 hour and then cooled in air) to prepare a powder sintered body (sintering step S12). Subsequently, the powder sintered body was subjected to a structure control heat treatment (retained at 900° C. for 1 hour and then cooled with oil) (structure control step S6) to produce an alloy product of the invention IAP-16.

The summary of the conditions employed for the production of the alloy products of the invention IAP-1 to IAP-16 and the comparative alloy products CAP-1 to CAP-4 is shown in Table 2.

TABLE 2

Conditions for production of alloy products of invention IAP-1 to IAP-16 and comparative alloy products CAP-1 to CAP-4

| Alloy product No. | Alloy No. | Annealing heat treatment (° C.) | Solution heat treatment (° C.) | Solidification heat treatment (° C.) |
|---|---|---|---|---|
| IAP-1 | IA-1 | 900 | 1100 | 600 |
| IAP-2 | IA-2 | | | 700 |
| IAP-3 | IA-3 | | | 900 |
| IAP-4 | IA-4 | | | |
| IAP-5 | IA-5 | 850 | | |
| IAP-6 | IA-6 | | | |
| IAP-7 | IA-7 | 750 | | |
| IAP-8 | IA-8 | 800 | 1100 | 900 |
| IAP-9 | | | 1200 | |
| IAP-10 | | | 1250 | |
| IAP-11 | IA-9 | 900 | 1050 | 600 |
| IAP-12 | | | 1100 | 700 |
| IAP-13 | | | 1250 | 900 |
| IAP-14 | IA-10 | — | — | — |
| IAP-15 | | | | 600 |
| IAP-16 | IA-11 | 750 | — | 900 |
| CAP-1 | CA-1 | — | — | 180 |
| CAP-2 | CA-2 | | | |
| CAP-3 | CA-3 | | 1200 | 800 |
| CAP-4 | CA-4 | 750 | 1050 | 700 |

—: indicating that step was not carried out

[Experiment 3]

(Tests/Evaluations on IAP-1 to IAP-16 and CAP-1 to CAP-4)

(1) Evaluation of Microstructure

A test specimen for structure observation use was collected from each of the alloy products, and then the surface of the test specimen was mirror-polished and was then electrolytically etched in an aqueous oxalic acid solution. The microstructure of the polished surface was observed, and an electron backscatter diffraction pattern (EBSP) analysis on the polished surface was also carried out to determine the occupancy of a ferrite phase (a ferrite ratio, unit: % by area). For the observation of a microstructure and the EBSP analysis, an SEM (Hitachi High-Tech Corporation, S-4300SE) equipped with a crystal direction measurement device (TSL Solutions KK.) was used.

The polished surface was also subjected to an X-ray diffraction (XRD) measurement to examine with respect to the presence or absence of a γ' phase (an $L1_2$-type Ni-based intermetallic compound phase) (i.e., the presence or absence of the detection of a diffraction peak that was able to be identified as a γ' phase).

The results of the evaluation of microstructures are shown in Table 3 below.

(2) Evaluation of Mechanical Properties

For the evaluation of a mechanical property, a room-temperature Vickers hardness test (load: 1 kg, load application time: 10 s) was carried out using a Vickers hardness meter. The room-temperature Vickers hardness Hv was determined as an average value of measurement values at five points. As a sample for the hardness test, a structure observation test specimen as mentioned above was used.

In the results of the room-temperature Vickers hardness test, "Hv<400" was rated as "grade D", "400≤Hv<550" was rated as "grade C", "550≤Hv<650" was rated as "grade B", "650≤Hv<700" was rated as "grade A", and "700≤Hv" was rated as "grade AA". A value belonging to grade A or higher was determined as "acceptable", and a value belonging to grade B or lower was determined as "unacceptable".

Subsequent to the room-temperature Vickers hardness test, each of the test specimens was subjected to a high-temperature Vickers hardness test (800° C., load: 1 kg, load application time: 10 s). In the high-temperature Vickers hardness test, a measurement value of 320 Hv or more at 800° C. was determined as "acceptable", and a measurement value of less than 320 Hv at 800° C. was determined as "unacceptable".

For the evaluation of another mechanical property, a test specimen for a tension test, which was collected separately from each of the alloy products, was subjected to a high-temperature tension test in accordance with JIS G 0567: 2012. In the high-temperature tension test, tension strength of 650 MPa or more at 700° C. was determined as "acceptable", and tensile strength of less than 650 MPa at 700° C. was determined as "unacceptable".

The results of the evaluation of the mechanical properties are also shown in Table 3.

(3) Evaluation of Corrosion Resistance

For the evaluation of corrosion resistance, a sulfuric acid resistance test was carried out. A test specimen for a sulfuric acid resistance test (width: 25 mm, length: 25 mm, thickness: 1.5 mm) was collected from each of the alloy products prepared above, and the corrosion resistance of the test specimen was evaluated as a corrosion speed in sulfuric acid. More specifically, a test in which the test specimen was immersed in boiled 5% sulfuric acid for 6 hours was carried out in accordance with JIS G 0591:2012. The mass of each of the test specimens before and after the test was measured to determine an average corrosion-reduced mass loss rate m (unit: $g/(m^2 \cdot h)$). An average of two measurement values was determined.

In the results of the measurement of the average mass loss rate, "m<0.1" was rated as "grade A", "0.1≤m<0.3" was rated as "grade B", "0.3≤m<0.5" was rated as "grade C", and "0.5≤m" was rated as "grade D". A value belonging to grade A was determined as "acceptable", and a value belonging to grade B or lower was determined as "unacceptable". The results of the evaluation of the corrosion resistance are also shown in Table 3.

was confirmed that all of these alloys had hardness equivalent to or better than that of the commercially available martensitic stainless steel CAP-1. In all of these alloys, the high-temperature Vickers hardness at 800° C. was 320 Hv or more. In all of these alloys, the tensile strength at 700° C. was 650 MPa or more. For IAP-14 to IAP-15, the tension test was not carried out, because it was difficult to draw an alloy coating layer alone in each of the products.

TABLE 3

Results of test evaluation on alloy products of invention IAP-1 to IAP-16 and comparative alloy products CAP-1 to CAP-4

| | | Microstructure | | Results of test evaluation | | | Corrosion |
| | | | | Mechanical properties | | | resistance |
| Alloy product No. | Alloy No. | Ferrite ratio (%) | Presence of γ' phase | Room-temperature Vickers hardness | High-temperature Vickers hardness | High-temperature tensile strength | Sulfuric acid resistance |
|---|---|---|---|---|---|---|---|
| IAP-1 | IA-1 | 78 | present | A | acceptable | acceptable | A |
| IAP-2 | IA-2 | 70 | | A | | | |
| IAP-3 | IA-3 | 82 | | AA | | | |
| IAP-4 | IA-4 | 83 | | AA | | | |
| IAP-5 | IA-5 | 85 | | AA | | | |
| IAP-6 | IA-6 | 81 | | AA | | | |
| IAP-7 | IA-7 | 82 | | AA | | | |
| IAP-8 | IA-8 | 88 | | AA | | | |
| IAP-9 | | 93 | | AA | | | |
| IAP-10 | | 82 | | AA | | | |
| IAP-11 | IA-9 | 79 | | A | | | |
| IAP-12 | | 71 | | A | | | |
| IAP-13 | | 83 | | AA | | | |
| IAP-14 | IA-10 | 92 | present | AA | acceptable | — | A |
| IAP-15 | | 70 | | A | | | |
| IAP-16 | IA-11 | 78 | present | A | acceptable | acceptable | A |
| CAP-1 | CA-1 | — | absent | A | unacceptable | unacceptable | D |
| CAP-2 | CA-2 | 45 | | D | | | A |
| CAP-3 | CA-3 | — | present | D | | acceptable | B |
| CAP-4 | CA-4 | 95 | | AA | acceptable | unacceptable | C |

—: indicating that step was not carried out

As shown in Table 3, with respect to each of the alloy products of the invention IAP-1 to IAP-16, in the evaluation of microstructure, the ferrite ratio was 60% by area or more and a γ' phase (an L1$_2$-type Ni-based intermetallic compound phase) was precipitated. From the observation of microstructures with an SEM and the XRD measurement, it was confirmed that each of IAP-1 to IAP-16 had such a microstructure that a dual-phase structure having a ferrite phase and an austenite phase coexisting therein served as a matrix phase and a γ' phase was dispersed/precipitated in the austenite phase (see FIG. 1). The schematic view of a microstructure shown in FIG. 1 is that of IAP-3.

In contrast, the comparative alloy product CAP-1 was a commercially available martensitic stainless steel, and therefore a ferrite ratio in the comparative alloy product was not measured. In the comparative alloy product, the presence of a γ' phase was not detected. In CAP-2 which was a commercially available dual-phase stainless steel having a ferrite ratio of 45% by area, the presence of a γ' phase was not detected. CAP-3 was a commercially available Ni-based alloy (Alloy 718), and therefore a ferrite ratio in the alloy was not measured. The presence of a γ' phase was not detected. In CAP-4, the ferrite ratio was 95% by area and the presence of a γ' phase was detected.

With respect to the evaluation of the mechanical properties, the room-temperature Vickers hardness of all of IAP-1 to IAP-16 belonged to grade A or higher (650≤Hv), and it In CAP-1 to CAP-4, in contrast, no one was determined as "acceptable" with respect to all of the tested and evaluated mechanical properties (room-temperature Vickers hardness, high-temperature Vickers hardness, high-temperature tensile strength).

With respect to the evaluation of corrosion resistance, all of IAP-1 to IAP-16 were rated as grade A (m<0.1), and it was confirmed that all of these products had high sulfuric acid resistance. In CAP-1 and CAP-3 to CAP-4, in contrast, the average sulfuric-acid-corrosion-induced mass loss rates were rated as grade B or lower (0.1≤m). Therefore, these alloy products had insufficient corrosion resistance.

The above-described embodiments and experiment examples have been specifically given in order to only help with understanding on the present invention, and the invention is not limited to the specific configurations described above. For example, some of the configurations of a certain embodiment may be replaced with configurations within the common technical knowledge of the persons skilled in the art, and configurations within the common technical knowledge of the persons skilled in the art may be added to the configurations of the subject embodiment. In the invention, some of the configurations of each embodiment or each experiment example described in the description may be omitted, replaced with other configurations or added with other configurations without departing from the technical spirit of the invention.

REFERENCE SIGN LIST 10 molten metal
11 raw material alloy mass
12 purified molten metal
20 cast molded body
30 mechanically processed molded body
40 rapidly solidified alloy powder
50 build-up welded material
51 base
52 alloy coating layer
60 powder molded body
70 powder sintered body

The invention claimed is:

1. A Cr—Fe—Ni-based alloy product which is a product produced using a Cr—Fe—Ni-based alloy containing Cr as a largest-content component, the chemical composition of the Cr—Fe—Ni-based alloy consisting of:
    44 to 75% by mass inclusive of Cr,
    10 to 33% by mass inclusive of Fe,
    10 to 40% by mass inclusive of Ni,
    0.05 to 2% by mass inclusive of Mn,
    0.05 to 1% by mass inclusive of Si,
    0.5 to 5% by mass inclusive of Al,
    more than 0% by mass and 0.1% by mass or less of C,
    more than 0% by mass and 2% by mass or less of N,
    more than 0% by mass and 0.2% by mass or less of O,
    more than 0% by mass and 0.04% by mass or less of P,
    more than 0% by mass and 0.01% by mass or less of S, and
    as an optional auxiliary component: at least one of Ti in an amount of more than 0% by mass and 4% by mass or less and Cu in an amount of more than 0% by mass and 2% by mass or less,
    wherein the product has such a microstructure that a dual-phase structure having a ferrite phase and an austenite phase coexisting therein serves as a matrix phase and an $L1_2$-type Ni-based intermetallic compound phase is dispersed and precipitated in the austenite phase, and
    wherein the occupancy of the ferrite phase in the microstructure in the product is 60% by area or more.

2. The Cr—Fe—Ni-based alloy product according to claim 1,
    wherein the Ni-based intermetallic compound phase comprises an $Ni_3Al$ phase and/or an $Ni_3(Al,Ti)$ phase.

3. The Cr—Fe—Ni-based alloy product according to claim 1,
    wherein the product is a cast molded body having a cast structure.

4. The Cr—Fe—Ni-based alloy product according to claim 1,
    wherein the product is a recrystallized molded body having a recrystallized structure.

5. The Cr—Fe—Ni-based alloy product according to claim 1,
    wherein the product is a rapidly solidified body having a rapidly solidified structure.

6. The Cr—Fe—Ni-based alloy product according to claim 5,
    wherein the rapidly solidified body is a composite body in which a coating layer composed of a Cr—Fe—Ni-based alloy having the rapidly solidified structure is formed on a base.

7. The Cr—Fe—Ni-based alloy product according to claim 1,
    wherein the product is a powder metallurgically molded body having a sintered structure.

8. The Cr—Fe—Ni-based alloy product according to claim 1,
    wherein:
    the room-temperature Vickers hardness is 650 Hv or more;
    the high-temperature Vickers hardness at 800° C. is 320 Hv or more; and
    the tensile strength at 700° C. is 650 MPa or more when a high-temperature tensile test is carried out in accordance with JIS G 0567.

9. The Cr—Fe—Ni-based alloy product according to claim 1,
    wherein the product is a powder having a rapidly solidified structure.

10. The Cr—Fe—Ni-based alloy product according to claim 1, wherein the average mass loss rate is less than 0.1 g/(m²·h) when a sulfuric acid corrosion test is carried out in accordance with JIS G 0591.

11. The Cr—Fe—Ni-based alloy product according to claim 1,
    wherein content of the Fe is from 15.5% by mass to 33% by mass.

12. The Cr—Fe—Ni-based alloy product according to claim 1,
    wherein content of the Cr is from 47.6% by mass to 75% by mass.

* * * * *